United States Patent
Zheng

(10) Patent No.: US 10,243,358 B2
(45) Date of Patent: Mar. 26, 2019

(54) SURGE PROTECTION DEVICE AND TELECOMMUNICATION EQUIPMENT COMPRISING THE SAME

(71) Applicant: Telefonaktiebolaget LM Ericsson (publ), Stockholm (SE)

(72) Inventor: Jianping Zheng, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 371 days.

(21) Appl. No.: 15/101,679

(22) PCT Filed: Dec. 18, 2013

(86) PCT No.: PCT/CN2013/089822
§ 371 (c)(1),
(2) Date: Jun. 3, 2016

(87) PCT Pub. No.: WO2015/089763
PCT Pub. Date: Jun. 25, 2015

(65) Prior Publication Data
US 2017/0005467 A1 Jan. 5, 2017

(51) Int. Cl.
*H02H 9/06* (2006.01)
*H02H 3/20* (2006.01)

(52) U.S. Cl.
CPC ............ *H02H 9/06* (2013.01); *H02H 3/205* (2013.01)

(58) Field of Classification Search
CPC ... H01C 7/12; H01C 7/126; H01F 2017/0093; H01L 23/552; H01L 2924/3011;
(Continued)

(56) References Cited

U.S. PATENT DOCUMENTS 4,625,255 A * 11/1986 Borkowicz .............. H02H 9/06
361/111
4,683,514 A * 7/1987 Cook ....................... H02H 9/06
361/111
(Continued)

FOREIGN PATENT DOCUMENTS

CN 201118227 Y 9/2008
CN 102118106 A 7/2011
(Continued)

OTHER PUBLICATIONS

Supplementary European Search Report for European Patent Application No. 13899924, completed Jul. 13, 2017, 5 pages.
(Continued)

*Primary Examiner* — Thienvu V Tran
*Assistant Examiner* — Nicolas Bellido
(74) *Attorney, Agent, or Firm* — Sage Patent Group

(57) ABSTRACT

The present disclosure provides a surge protection device comprising a surge arrestor and an arrestor assistor. The surge arrestor is arranged within a circuit branch connected in parallel with a load and adapted to clamp a load voltage to a clamping voltage not larger than a load voltage limit when the load voltage rises to a breakdown voltage of the surge arrestor, the breakdown voltage increasing with a rising rate of the load voltage. The arrestor assistor is connected in parallel with the surge arrestor within the circuit branch and adapted to make the load voltage rise to the breakdown voltage not larger than the load voltage limit. The present disclosure also provides a telecommunication equipment comprising the surge protection device.

10 Claims, 7 Drawing Sheets

(58) Field of Classification Search
CPC ......... H01R 13/6666; H01T 1/14; H01T 1/20;
H01T 1/22; H01T 4/06; H01T 4/08;
H01T 4/12; H02G 13/00; H02H 1/04;
H02H 3/05; H02H 3/20; H02H 3/205;
H02H 3/22; H02H 9/042; H02H 9/06;
H02H 9/046; H04M 3/18; H04Q 1/146
USPC ........................ 361/117, 118, 119, 120, 111
See application file for complete search history.

(56) References Cited

U.S. PATENT DOCUMENTS

| | | | | |
|---|---|---|---|---|
| 8,908,340 | B2* | 12/2014 | Trumbo | H02H 9/04 |
| | | | | 361/56 |
| 8,929,042 | B2* | 1/2015 | Pfitzer | H02H 9/041 |
| | | | | 361/91.1 |
| 2012/0112872 | A1 | 5/2012 | Kang et al. | |
| 2012/0250205 | A1 | 10/2012 | Pfitzer et al. | |
| 2012/0327547 | A1 | 12/2012 | Andersson et al. | |
| 2013/0114168 | A1 | 5/2013 | Andersson | |
| 2013/0215544 | A1 | 8/2013 | Igl et al. | |
| 2014/0055898 | A1* | 2/2014 | Kostakis | H02H 3/20 |
| | | | | 361/91.5 |
| 2014/0268462 | A1* | 9/2014 | Mikolajczak | H02H 9/04 |
| | | | | 361/91.1 |
| 2015/0257211 | A1* | 9/2015 | Johnson | H05B 33/089 |
| | | | | 315/121 |

FOREIGN PATENT DOCUMENTS

| | | |
|---|---|---|
| EP | 0123126 A1 | 10/1984 |
| EP | 1551089 A1 | 7/2005 |

OTHER PUBLICATIONS

International Preliminary Report on Patentability for International Patent Application No. PCT/CN2013/089822, dated Jun. 30, 2016, 5 pages.
Ardley, Tim, B.Sc (Hons), "First Principles of a Gas Discharge Tube (GDT) Primary Protector," www.bourns.com, Revision 2, Feb. 2008, Bourns, Inc., 35 pages.
International Search Report and Written Opinion for International Patent Application No. PCT/CN2013/089822, dated Sep. 1, 2014, 11 pages.

* cited by examiner

SURGE PROTECTION DEVICE AND TELECOMMUNICATION EQUIPMENT COMPRISING THE SAME

This application is a 35 U.S.C. § 371 national phase filing of International Application No. PCT/CN2013/089822, filed Dec. 18, 2013, the disclosure of which is incorporated herein by reference in its entirety.

TECHNICAL FIELD

The present disclosure generally relates to the technical field of circuit protection, and particularly, to a surge protection device (SPD) and a telecommunication equipment comprising the SPD.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

Outdoor telecommunication equipments, such as Radio Remote Units (RRUs)/Radio Remote Heads (RRHs), Radio Base Stations (RBSs) and Base Transceiver Stations (BTSs), are often exposed to unexpected situations or occurrences, such as lightning strike or high voltage, which may generate huge energy during an extremely short period and cause system performance error or critical irreparable hardware damage. To protect the telecommunication equipments against such kind of damage caused by lightning strikes and electric surges, SPDs have been developed and applied.

Traditionally, it was believed that, to ensure design effectiveness for lightning strike protection, an SPD shall have multiple stages (two even three stages) to accommodate protective components. Between two consecutive stages, a serial inductor shall be connected, as illustrated in FIG. 1. In a case where the telecommunication equipment to be protected has large power consumption, the serial inductor may have a large dimension. In addition, in order to have enough inductance for the SPD, the inductor may increase its dimension and weight to avoid magnetic saturation in itself.

Due to the significant contribution of the inductor to the multi-stage SPD's dimension, little improvement has been achieved so far in reducing the SPD's dimension as illustrated in FIG. 2.

On the other hand, telecommunication equipments are increasingly subject to limitation on mechanical dimension, as also illustrated in FIG. 2. The unreduced dimension of the SPD constitutes a bottleneck for the miniaturization of the telecommunication equipments.

Considering that the large dimension of the multi-stage SPD is mainly due to the use of inductor, a single-stage SPD obtained by removing serial inductors as well as following stages from a multi-stage SPD has been proposed to fit for small telecommunication equipments. FIG. 3 depicts an example of such a single-stage SPD, wherein two protective components are contained in the only one stage of the SPD. Typically, the protective components include a Gas Discharge Tube (GDT) connected in series with a varistor.

In practical use, the single-stage SPD is connected in parallel with a load to be protected and clamps a load voltage $V_{load}$ to a clamping voltage $V_{clamp}$ not larger than a load voltage limit $V_{limit}$ when the load voltage $V_{load}$ rises to a breakdown voltage $V_{ATH}$ of the SPD.

Undesirably, the single-stage SPD has a variable breakdown voltage, which increases with a rising rate of a voltage across a load to be protected by the SPD. That is, the breakdown voltage $V_{ATH}$ of the SPD is high when the load suffers from a steep voltage impulse and thus the load voltage $V_{load}$ increases at a high rate as indicated by the dashed line in FIG. 4, while the breakdown voltage $V_{ATH}$ of the SPD is low when the load suffers from a gentle voltage impulse and thus the load voltage $V_{load}$ increases at a low rate as indicated by the solid line in FIG. 4.

Let $V_{ATH\_DC}$ and $V_{ATH\_Imp@R}$ respectively denote a Direct Current (DC) breakdown voltage corresponding to a gentle voltage increase and an impulse breakdown voltage corresponding to a steep voltage increase, a formula may be given as follows to describe the relationship between $V_{ATH\_DC}$ and $V_{ATH\_Imp@R}$:

$$V_{ATH\_Imp@R} = \alpha(R) \times V_{ATH\_DC} + \beta(R) \quad (1)$$

where R represents the rising rate of the steep voltage increase, $\alpha(R)$ represents a function of R and takes a value higher than 1, and $\beta(R)$ represents a function of R and takes a value higher than 0.

From the above formula, it can be concluded that $V_{ATH\_Imp@R}$ must be higher than $V_{ATH\_DC}$. Accordingly, there is a risk for the impulse breakdown voltage $V_{ATH\_Imp@R}$ and hence the load voltage $V_{load}$ to exceed the load voltage limit $V_{limit}$ and thus cause damage to the load, even if both the clamping voltage $V_{clamp}$ and the DC breakdown voltage $V_{ATH\_DC}$ of the SPD are selected to be lower than the load voltage limit $V_{limit}$.

For illustration, FIG. 5 depicts such a risky scenario where an SPD with a clamping voltage $V_{clamp} \approx 40V$ and a DC break voltage $V_{ATH\_DC} = 180V$ is used for protecting a telecommunication equipment with a load voltage limit $V_{limit} = 200V$. At the time point 1.0 us, a lightning strike with a peak current 1.8 KA and a 10/350 us waveform is injected into the telecommunication equipment and causes the load voltage $V_{load}$ of the telecommunication equipment to increase at a relatively high rising rate R, which may result in an impulse breakdown voltage $V_{ATH\_Imp}$ up to 588V. In this case, the SPD is delayed to be triggered for clamping the load voltage $V_{load}$ to the clamping voltage $V_{clamp}$ until the time point 1.9 us when the load voltage $V_{load}$ rises to 588V.

As a result, the load voltage $V_{load}$ of the telecommunication equipment as illustrated by the solid line in FIG. 5 may exceed the load voltage limit $V_{limit}$ during the triggering delay $T_{delay}$, and cause irreparable damage to the telecommunication equipment.

According to FIG. 6 which illustrates how the peak voltage across the load of the telecommunication equipment and the triggering delay may change with the peak current of the lightning strike as a solid line and a dashed line respectively, the prior art single-stage SPD is incapable of protecting the telecommunication equipment against most lightning strikes in the natural world, whose peak currents are higher than 250 A and accordingly cause peak load voltages higher than the load voltage limit $V_{limit} = 200V$.

Simply selecting a DC breakdown voltage $V_{ATH\_DC}$ as low as possible cannot eliminate the risk for the impulse breakdown voltage $V_{ATH\_Imp}$ and hence the load voltage $V_{load}$ to exceed the load voltage limit $V_{limit}$, because the $V_{ATH\_DC}$ multiplied by the item $\alpha(R)$ in formula (1) and then added with $\beta(R)$ may take a value larger than the load voltage limit $V_{limit}$ when the rising rate of the load voltage is high enough. Furthermore, when a $V_{ATH\_DC}$ less than 100V is selected for a DC system, it will interfere with normal DC voltages in the system, thereby causing a very low impedance and even a short circuit undesirably.

As a feasible solution for completely avoiding the risk for the impulse breakdown voltage $V_{ATH\_Imp}$ and hence the load voltage $V_{load}$ to exceed the load voltage limit $V_{limit}$, US2013/0114168A1 proposes a special SPD which is able to be triggered on/off by an external signal. Unfavorably, a complicated circuit needs to be designed for enabling communications between the SPD and an external circuit. In addition, being communicatively connected with the SPD, the external circuit itself is vulnerable to unexpected damage caused by high-level lightning strikes and hence unable to provide any external triggering signal to the SPD.

SUMMARY

In view of the foregoing, an object of the present disclosure is to overcome at least one of the drawbacks of the prior art single-stage SPD by providing a simply-structured and reliable single-stage SPD.

To achieve the object, according to a first aspect of the disclosure, there is provided an SPD comprising a surge arrestor and an arrestor assistor. The surge arrestor is arranged within a circuit branch connected in parallel with a load and adapted to clamp a load voltage to a clamping voltage not larger than a load voltage limit when the load voltage rises to a breakdown voltage of the surge arrestor, the breakdown voltage increasing with a rising rate of the load voltage. The arrestor assistor is connected in parallel with the surge arrestor within the circuit branch and adapted to make the load voltage rise to the breakdown voltage not larger than the load voltage limit.

With the arrestor assistor connected in parallel with the surge arrestor and adapted to make the load voltage rise to the breakdown voltage of the surge arrestor under or at the load voltage limit, the risk for the impulse breakdown voltage and hence the load voltage to exceed the load voltage limit can be thoroughly eliminated.

Furthermore, since the arrestor assistor directly acts on the load voltage to control its rising instead of indirectly instructing the surge arrestor to clamp the load voltage via an external triggering signal, no communication occurs between the surge arrestor and the arrestor assistor. Accordingly, the SPD can be simply structured and reliable.

According to a second aspect of the disclosure, the breakdown voltage may have a minimum value not larger than the load voltage limit.

According to a third aspect of the disclosure, the arrestor assistor may be further adapted to cut off a current flowing through it when the load voltage rises to the breakdown voltage of the surge arrestor.

According to a fourth aspect of the disclosure, the arrestor assistor may comprise a transient voltage suppressor diode having a clamping voltage not larger than the load voltage limit and a reverse breakdown voltage less than the clamping voltage.

The TVS diode prevents the load voltage from exceeding the clamping voltage and thus suppresses the rising rate of the load voltage when the load voltage rises to the reverse breakdown voltage.

According to a fifth aspect of the disclosure, the arrestor assistor may further comprise a semiconductor switch connected in series with the TVS diode. The semiconductor switch is turned off when the load voltage rises to the breakdown voltage of the surge arrestor and is turned on when the load voltage drops to a normal operation voltage not larger than the clamping voltage.

The semiconductor switch may consist of at least one transistor, which may be a Metal-Oxide-Semiconductor Field Effect Transistor (MOSFET), an Insulated Gate Bipolar Transistor (IGBT) or a Bipolar Junction Transistor (BJT).

According to a sixth aspect of the disclosure, the arrestor assistor may further comprise a voltage monitor and a switch driver. The voltage monitor may be adapted to monitor the load voltage. The switch driver may be adapted to turn off the semiconductor switch when the voltage monitor monitors that the load voltage rises to the breakdown voltage of the surge arrestor and to turn on the semiconductor switch when the voltage monitor monitors that the load voltage drops to a normal operation voltage not larger than the clamping voltage.

According to a seventh aspect of the disclosure, the SPD may further comprise another surge arrestor, having a breakdown value being ignorable as compared with the breakdown value of the surge arrestor and connected in series with the surge arrestor and the assistor within the circuit branch. The other surge arrestor may be a varistor. The surge arrestor may be a GDT or a spark gap.

According to an eighth aspect of the disclosure, a Surface Mount Technology (SMT) may be used for mounting components of the arrestor assistor.

According to a ninth aspect of the disclosure, there is provided a telecommunication equipment comprising the SPD according to any of the first to the ninth aspects. The telecommunication equipment is an RRU, an RBS or a BTS.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Figure 1:
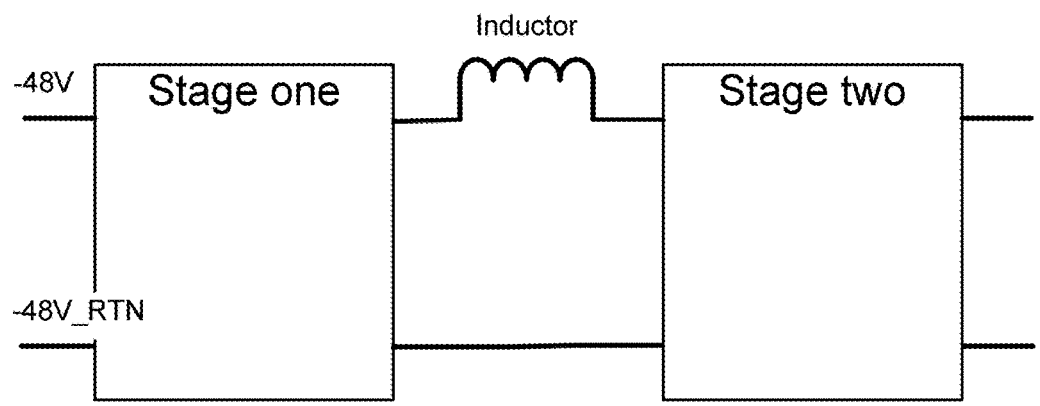
FIG. 1 is a diagram illustrating an arrangement of a prior art two-stage SPD.
Figure 2:
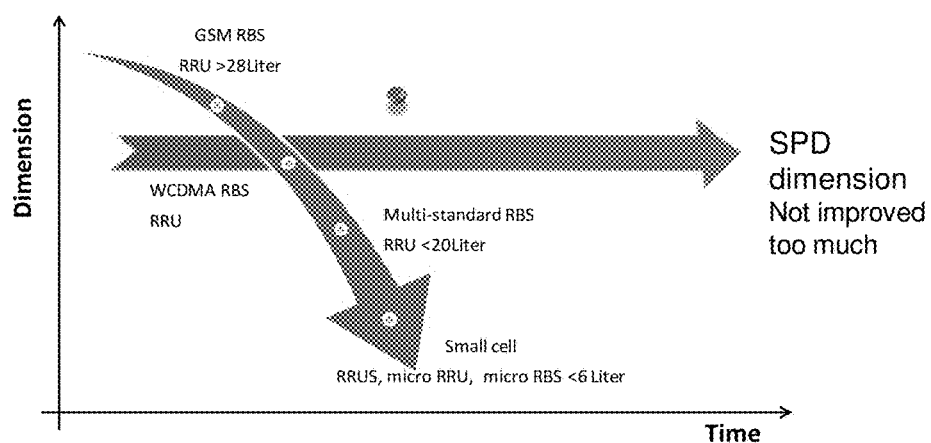
FIG. 2 is a diagram illustrating a requirement for miniaturizing telecommunication equipments and an SPD dimension limitation.
Figure 3:
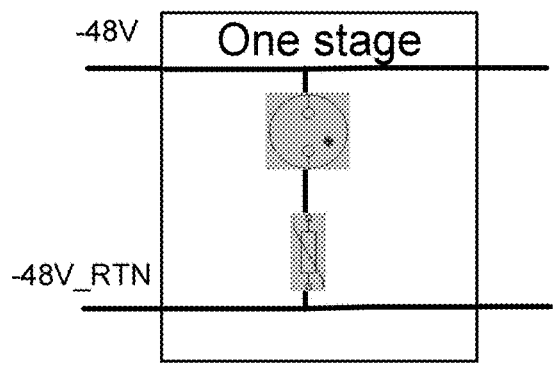
FIG. 3 is a diagram illustrating an arrangement of a prior art single-stage SPD.
Figure 4:
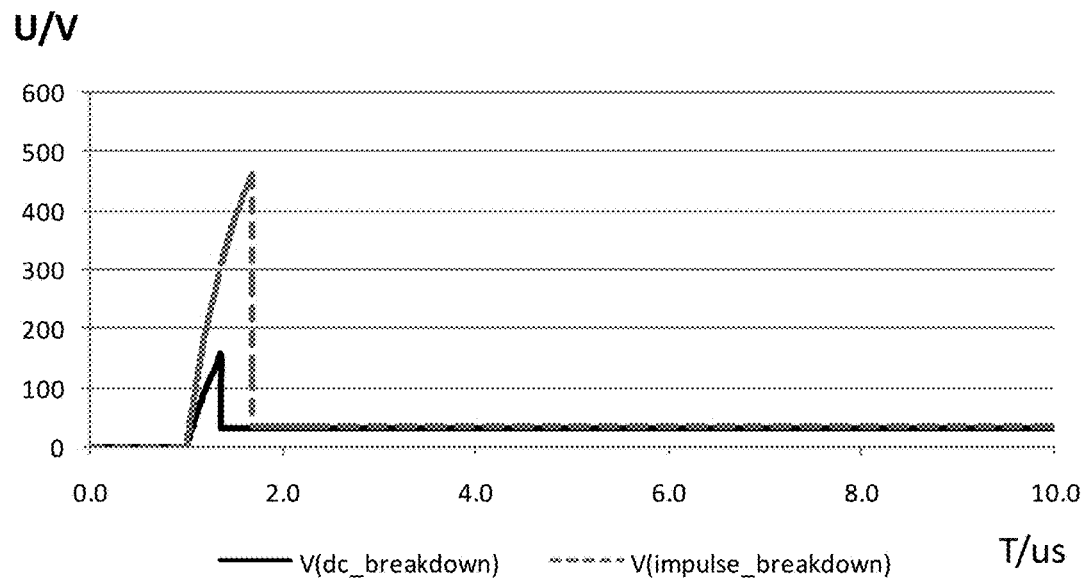
FIG. 4 is a plot illustrating different responses of the prior art single-stage SPD to gentle and steep voltage impulses.
Figure 5:
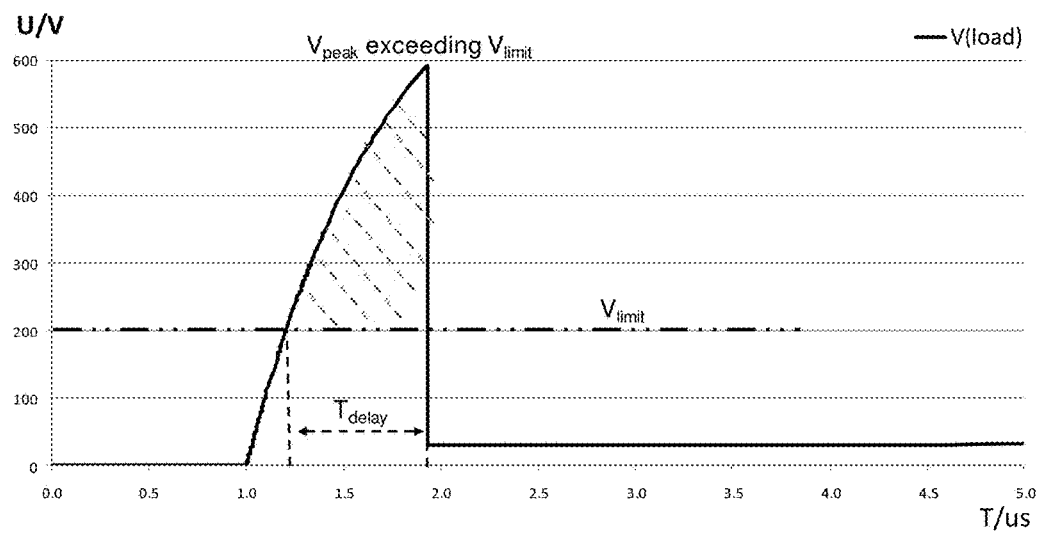
FIG. 5 is a plot illustrating a response of the prior art single-stage SPD to a steep voltage impulse.
Figure 6:
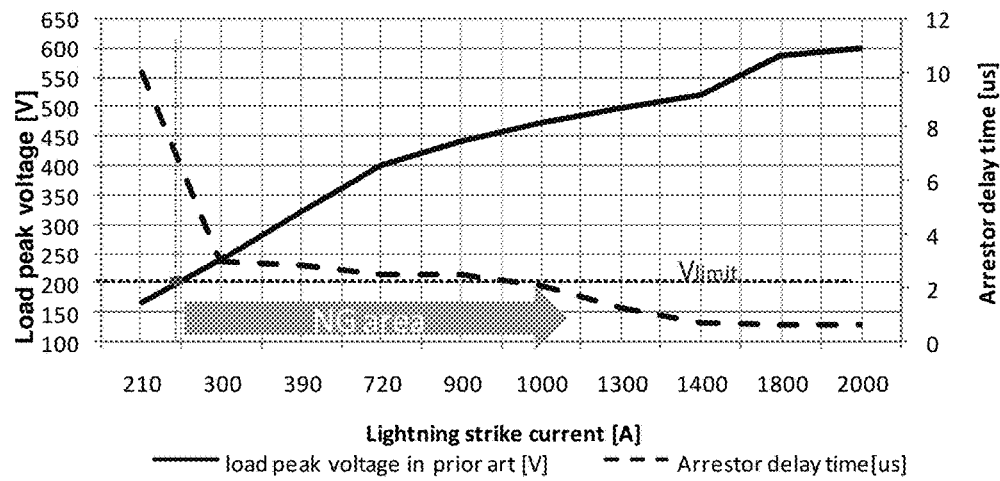
FIG. 6 is a plot illustrating how a peak load voltage and a triggering delay may change with a peak current level of a lightning strike for the prior art single-stage SPD.
Figure 7:
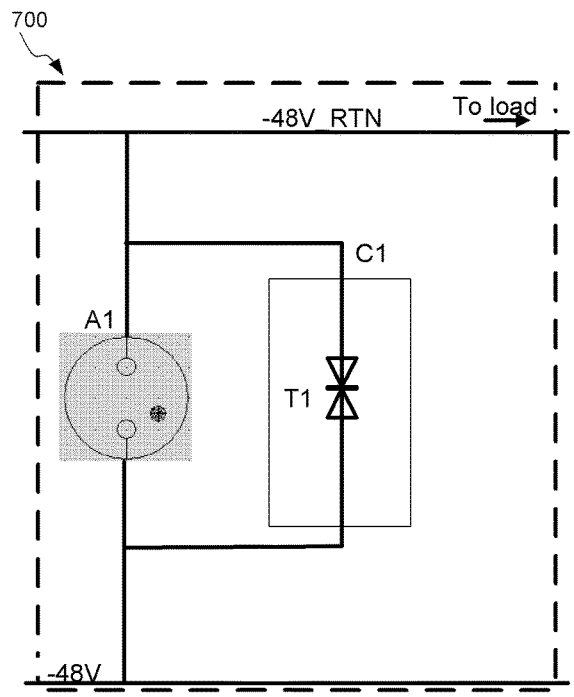
FIG. 7 is a diagram illustrating an arrangement of a single-stage SPD according to a first embodiment of the present disclosure.

Initially, a simply-structured single-stage SPD 700 according to a first embodiment of the disclosure will be described with respect to FIG. 7. As illustrated, the SPD 700 comprises a surge arrestor A1 and an arrestor assistor C1. The surge arrestor A1 is arranged within a circuit branch connected in parallel with a load and adapted to clamp a load voltage $V_{load}$ to a clamping voltage $V_{clamp}$ not larger than a load voltage limit $V_{limit}$ when the load voltage $V_{load}$ rises to a breakdown voltage $V_{A1TH}$ of the surge arrestor A1, the breakdown voltage $V_{A1TH}$ increasing with a rising rate of the load voltage $V_{load}$. The arrestor assistor C1 is connected in parallel with the surge arrestor A1 within the circuit branch and adapted to make the load voltage $V_{load}$ rise to the breakdown voltage $V_{A1TH}$ not larger than the load voltage limit $V_{limit}$.

With the arrestor assistor C1 connected in parallel with the surge arrestor A1 and adapted to make the load voltage $V_{load}$ rise to the breakdown voltage $V_{A1TH}$ of the surge arrestor A1 under or at the load voltage limit $V_{limit}$, the risk for the impulse breakdown voltage $V_{ATH\_Imp}$ and hence the load voltage $V_{load}$ to exceed the load voltage limit $V_{limit}$ can be thoroughly eliminated.

Furthermore, since the arrestor assistor C1 directly acts on the load voltage $V_{load}$ to control its rising instead of indirectly instructing the surge arrestor A1 to clamp the load voltage $V_{load}$ via an external triggering signal, no communication occurs between the surge arrestor A1 and the arrestor assistor C1. Accordingly, the SPD 700 can be simply structured and reliable.

Figure 8:
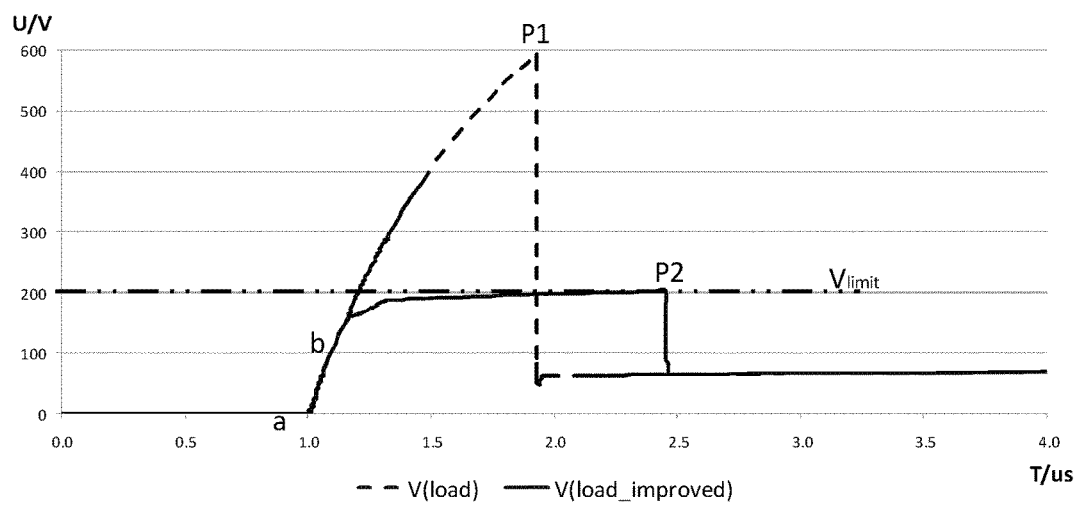
FIG. 8 is a plot illustrating a comparison between performances of the prior art single-stage SPD and the single-stage SPD according to the present disclosure responsive to a steep voltage impulse.

For a performance comparison between the prior art single-stage SPD and the proposed single-stage SPD 700, FIG. 8 depicts responses of both single-stage SPDs to a steep voltage impulse. As illustrated by the dashed line in FIG. 8, the prior art single-stage SPD cannot clamp the load voltage $V_{load}$ to the clamping voltage $V_{clamp}$ until it rises to a peak value P1, which is much higher than the load voltage limit $V_{limit}$ and may cause damage to the load. In contrast, as illustrated by the solid line in FIG. 8, the proposed SPD 700 clamps the load voltage $V_{load}$ to the clamping voltage $V_{clamp}$ when it rises to a peak value P2 not larger than the load voltage limit $V_{limit}$. As such, the load is free from overvoltage and damage caused thereby.

Figure 9:
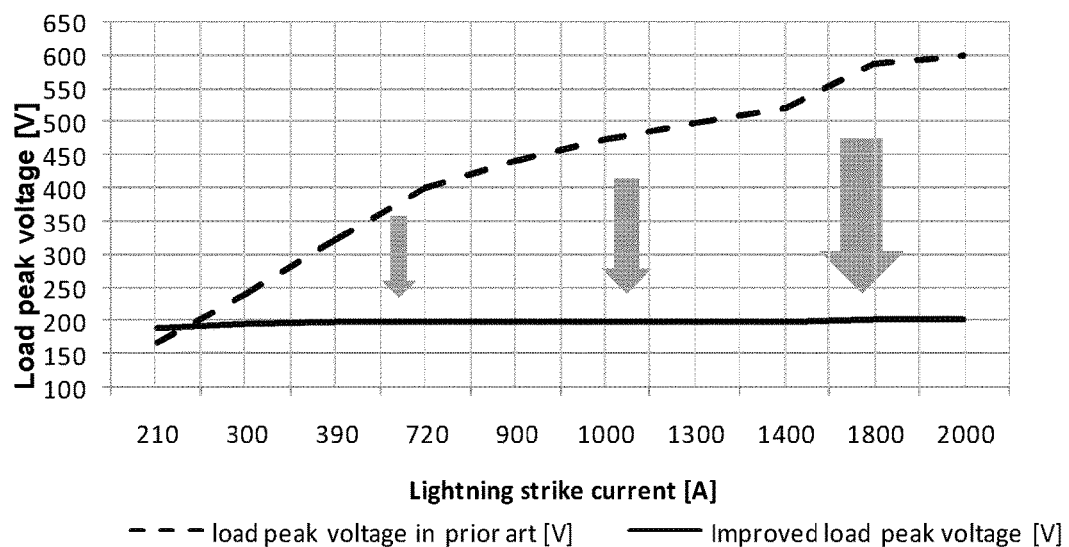
FIG. 9 is a plot illustrating an improvement of the single-stage SPD according to the present disclosure in suppressing a peak load voltage as compared with the prior art single-stage SPD.

According to the indication of the solid line in FIG. 9, the proposed SPD 700 can effectively keep the peak load voltage not higher than the load voltage limit (say 200V) for a wide range of peak lighting strike currents including those higher than 200 A. This is a significant improvement as compared with the prior art single-stage SPD, which can only handle a narrow range of peak lighting strike excluding those higher than 250 A as indicated by the dashed line in FIG. 9.

As an illustrative rather than restrictive implementation, a Gas Discharge Tube GDT or a spark gap having a minimum breakdown voltage (i.e., DC breakdown voltage $V_{A1TH\_DC}$) not larger than the load voltage limit $V_{limit}$ may be used as the surge arrestor A1. The arrestor assistor C1 may comprise a transient voltage suppressor TVS diode T1 having a clamping voltage $V_{CTVS}$ not larger than the load voltage limit $V_{limit}$ and a reverse breakdown voltage $V_{BRTVS}$ less than the clamping voltage $V_{CTVS}$.

With such a configuration, when the load voltage $V_{load}$ in response to a steep voltage impulse applied on the load rises to the reverse breakdown voltage $V_{BRTVS}$ (which is illustratively denoted in FIG. 8 as point b), the TVS diode T1 immediately acts on the load voltage $V_{load}$ to prevent the load voltage $V_{load}$ from exceeding the clamping voltage $V_{CTVS}$. As a result, the rising rate of the load voltage $V_{load}$ is suppressed, and the breakdown voltage $V_{A1TH}$ of the surge arrestor A1 falls towards the DC breakdown voltage $V_{A1TH\_DC}$. At a certain point (which is illustratively denoted in FIG. 8 as P2), the breakdown voltage $V_{A1TH}$ falls below the load $V_{limit}$ and the load voltage $V_{load}$ rises to the breakdown voltage $V_{A1TH}$. Accordingly, the load voltage $V_{load}$ is clamped by the surge arrestor A1 to the clamping voltage $V_{clamp}$ which causes no damage to the load.

In this regard, the transient voltage suppressor TVS diode T1 makes the load voltage $V_{load}$ rise to the breakdown voltage $V_{A1TH}$ under or at the load voltage limit $V_{limit}$ by preventing the load voltage $V_{load}$ from exceeding the load voltage limit $V_{limit}$ and accordingly enabling the breakdown voltage $V_{A1TH}$ of the surge arrestor A1 to fall below the load voltage limit $V_{limit}$.

Further, as compared with using only one high-performance TVS diode to protect the load, the above solution of using an adequate TVS diode in combination with a GDT or a spark gap significantly lowers the manufacturing cost of the SPD.

In one implementation, the arrestor assistor C1 may be further adapted to cut off a current flowing through it when the load voltage $V_{load}$ rises to the breakdown voltage $V_{A1TH}$ of the surge arrestor A1. In this manner, the work time of the arrestor assistor C1 may be shortened, the lifespan of the arrestor assistor C1 may be lengthened, and the performance requirements for the arrestor assistor C1 may be loosened.

Figure 10:
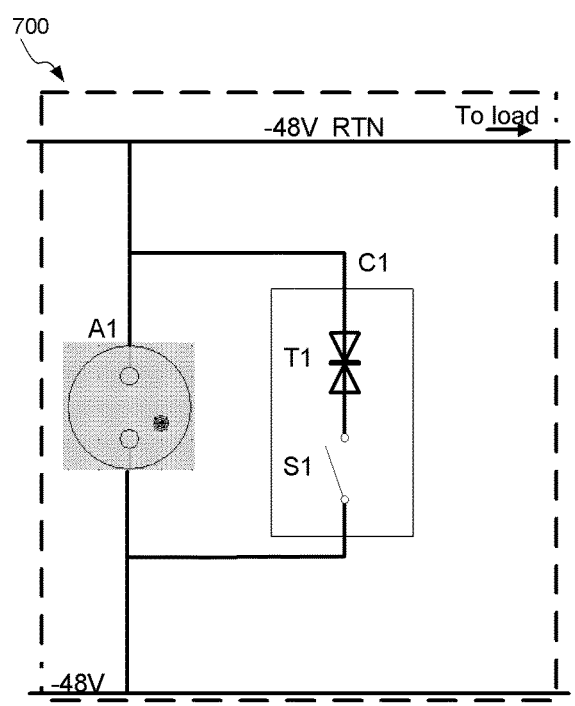
FIG. 10 is a diagram illustrating an arrangement of a single-stage SPD according to a second embodiment of the present disclosure.

As an example of the above implementation, the arrestor assistor C1 may further comprise a semiconductor switch S1 connected in series with the TVS diode T1, according to a second embodiment of the present disclosure as illustrated in FIG. 10. The semiconductor switch S1 may be turned off when the load voltage $V_{load}$ rises to the breakdown voltage $V_{A1TH}$ of the surge arrestor A1 and may be turned on when the load voltage $V_{load}$ drops to a normal operation voltage $V_{NORMAL}$ not larger than the clamping voltage $V_{clamp}$.

Figure 11:
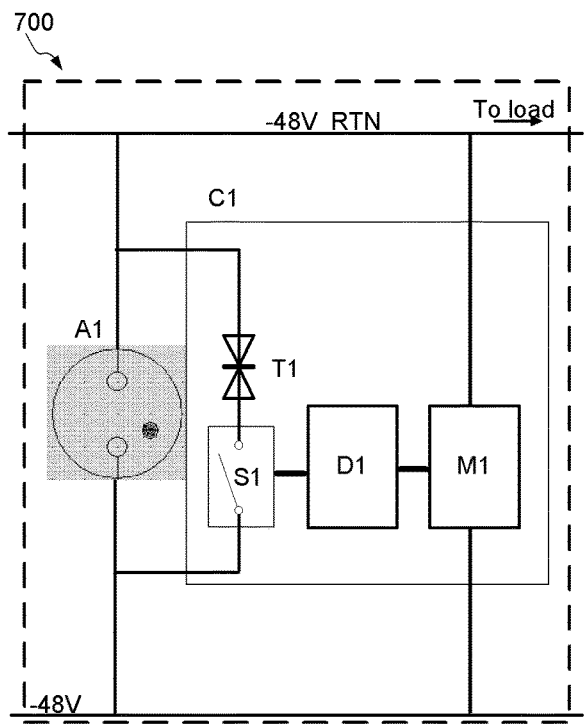
FIG. 11 is a diagram illustrating an arrangement of a single-stage SPD according to a third embodiment of the present disclosure.

According to a third embodiment of the present disclosure as illustrated in FIG. 11, the arrestor assistor C1 may further comprise a voltage monitor M1 and a switch driver D1. The voltage monitor M1 may be adapted to monitor the load voltage $V_{load}$. The switch driver D1 may be adapted to turn off the semiconductor switch S1 when the voltage monitor M1 monitors that the load voltage $V_{load}$ rises to the breakdown voltage $V_{A1TH}$ of the surge arrestor A1 and to turn on the semiconductor switch S1 when the voltage monitor M1 monitors that the load voltage $V_{load}$ drops to a normal operation voltage $V_{NORMAL}$ not larger than the clamping voltage $V_{clamp}$.

Figure 12:
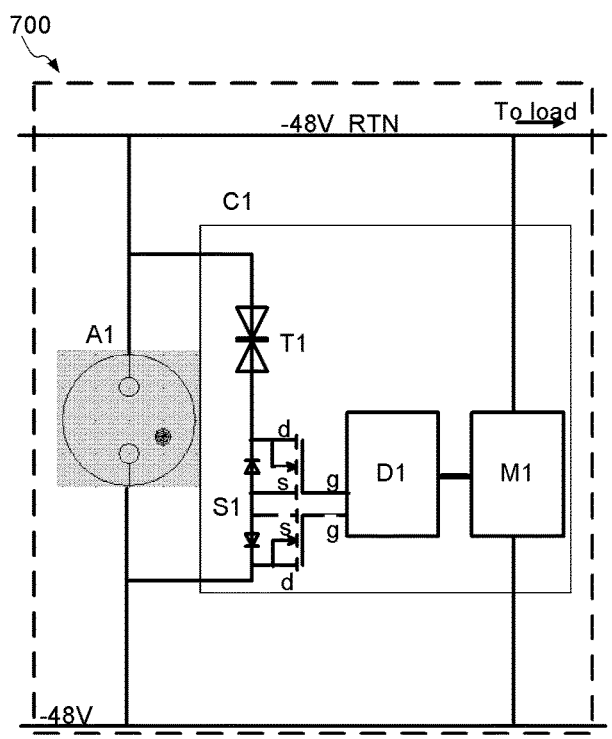
FIG. 12 is a diagram illustrating an arrangement of a single-stage SPD according to a fourth embodiment of the present disclosure.

According to a fourth embodiment of the present disclosure as illustrated in FIG. 12, the semiconductor switch S1 may consist of at least one transistor. The transistor may be a Metal-Oxide-Semiconductor Field Effect Transistor (MOSFET), an Insulated Gate Bipolar Transistor (IGBT) or a Bipolar Junction Transistor (BJT).

Figure 13:
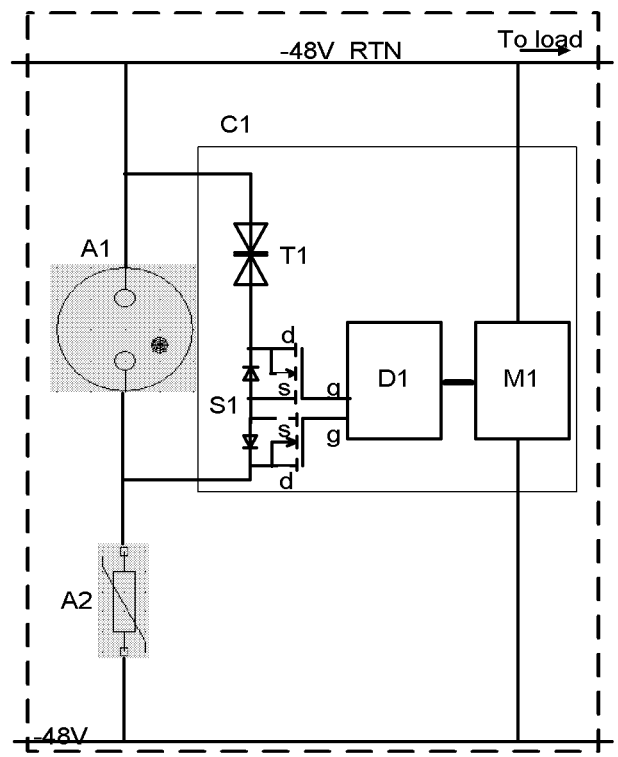
FIG. 13 is a diagram illustrating an arrangement of a single-stage SPD according to a fifth embodiment of the present disclosure.

In practical implementation, the proposed SPD 700 may further comprise another surge arrestor A2 connected in series with the surge arrestor A1 and the assistor C1, as illustrated in FIG. 13. For the SPD to be able to handle a peak lighting strike current up to 4000 A, the surge arrestor A2 shall have a breakdown value $V_{A2TH}$ being ignorable as compared with the breakdown value $V_{A1TH}$ of the surge arrestor A1. In an embodiment, the surge arrestor A2 may be a varistor.

In an embodiment, all components of the arrestor assistor C1 may be mounted on the opposite side of the Printed Circuit Board (PCB) of the SPD using the Surface Mount Technology (SMT), so that the dimension of the SPD can be kept as small as possible.

Figure 14:
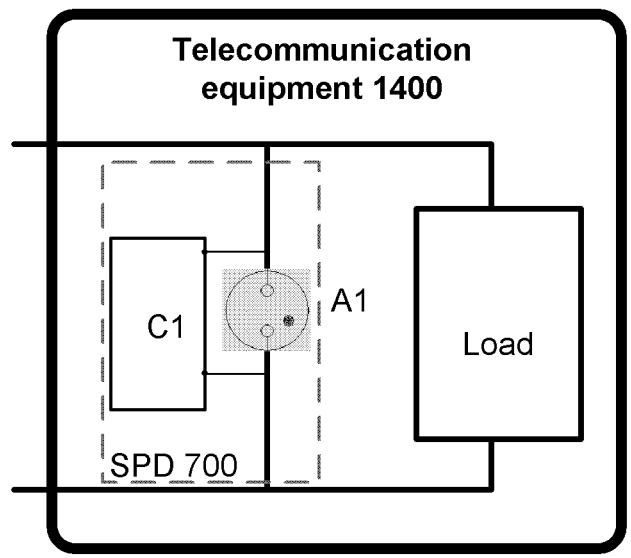
FIG. 14 is a diagram illustrating an arrangement of a telecommunication equipment according to the present disclosure.

Thanks to its small dimension and powerful capability, the proposed single-stage SPD 700 is highly suitable to be used with modern telecommunication equipments, such as RRUs, an RBSs or BTSs, which are increasingly subject to limitation on mechanical dimension. For illustration, FIG. 14 depicts a telecommunication equipment 1400 comprising the proposed single-stage SPD 700.

The present disclosure has been described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A surge protection device, comprising:
   a surge arrestor,
      arranged within a circuit branch connected in parallel with a load, and
      adapted to clamp a load voltage ($V_{load}$) to a clamping voltage ($V_{clamp}$) not larger than a load voltage limit ($V_{limit}$) when the load voltage ($V_{load}$) rises to a breakdown voltage ($V_{A1TH}$) of the surge arrestor, the breakdown voltage ($V_{A1TH}$) increasing with a rising rate of the load voltage ($V_{load}$); and
   an arrestor assistor,
      connected in parallel with the surge arrestor within the circuit branch, and
      adapted to allow the load voltage (Vload) to rise to the breakdown voltage ($V_{A1TH}$) not larger than the load voltage limit ($V_{limit}$),
   the arrestor assistor comprising:
      a transient voltage suppressor (TVS) diode having a clamping voltage ($V_{CTVS}$) not larger than the load voltage limit ($V_{limit}$) and a reverse breakdown voltage ($V_{BRTVS}$) less than the clamping voltage ($V_{CTVS}$), wherein the TVS diode prevents the load voltage ($V_{load}$) from exceeding the clamping voltage ($V_{CTVS}$) and thus suppresses the rising rate of the load voltage ($V_{load}$) when the load voltage ($V_{load}$) rises to the reverse breakdown voltage ($V_{BRTVS}$); and
      a semiconductor switch connected in series with the TVS diode, wherein the semiconductor switch is turned off when the load voltage ($V_{load}$) rises to the breakdown voltage ($V_{A1TH}$) of the surge arrestor and is turned on when the load voltage ($V_{load}$) drops to a normal operation voltage ($V_{NORMAL}$) not larger than the clamping voltage ($V_{clamp}$).

2. The surge protection device of claim 1, wherein the breakdown voltage ($V_{A1TH}$) has a minimum value ($V_{A1TH\_DC}$) not larger than the load voltage limit ($V_{limit}$).

3. The surge protection device of claim 1, wherein the arrestor assistor is further adapted to cut off a current flowing through it when the load voltage ($V_{load}$) rises to the breakdown voltage ($V_{A1TH}$) of the surge arrestor.

4. The surge protection device of claim 1, wherein the arrestor assistor further comprises:
   a voltage monitor adapted to monitor the load voltage; and
   a switch driver adapted to turn off the semiconductor switch when the voltage monitor monitors that the load voltage ($V_{load}$) rises to the breakdown voltage ($V_{A1TH}$) of the surge arrestor and to turn on the semiconductor switch when the voltage monitor monitors that the load voltage ($V_{load}$) drops to the normal operation voltage ($V_{NORMAL}$) not larger than the clamping voltage ($V_{clamp}$).

5. The surge protection device of claim 1, further comprising:
   another surge arrestor, having a breakdown value ($V_{A2TH}$) being ignorable as compared with the breakdown value ($V_{A1TH}$) of the surge arrestor and connected in series with the surge arrestor and the assistor within the circuit branch.

6. The surge protection device of claim 1, wherein the surge arrestor is a Gas Discharge Tube (GDT) or a spark gap.

7. The surge protection device of claim 5, wherein the other surge arrestor is a varistor.

8. The surge protection device of claim 1, wherein the semiconductor switch consists of at least one transistor.

9. The surge protection device of claim 8, wherein the transistor is a Metal-Oxide-Semiconductor Field Effect Transistor (MOSFET), an Insulated Gate Bipolar Transistor (IGBT) or a Bipolar Junction Transistor (BJT).

10. The surge protection device of claim 1, wherein a Surface Mount Technology (SMT) is used for mounting components of the arrestor assistor.

\* \* \* \* \*